United States Patent [15] 3,674,670
Erikson et al. [45] July 4, 1972

[54] COATING METHOD

[72] Inventors: J. Alden Erikson, Gibsonia; Gerald R. Gacesa, Tarentum, both of Pa.

[73] Assignee: PPG Industries, Inc., Pittsburgh, Pa.

[22] Filed: Dec. 4, 1964

[21] Appl. No.: 416,140

[52] U.S. Cl. ........................................................204/181
[51] Int. Cl. ..................................B01k 5/02, C23b 13/00
[58] Field of Search...........................204/181, 30, 16, 20, 38

[56] References Cited

UNITED STATES PATENTS

| | | | |
|---|---|---|---|
| 1,850,738 | 3/1932 | Baranowski | 204/20 |
| 3,230,162 | 1/1966 | Gilchrist | 204/181 |
| 3,366,563 | 1/1968 | Hart et al. | 204/181 |
| 3,369,983 | 2/1968 | Hart et al. | 204/181 |
| 3,403,088 | 9/1968 | Hart | 204/181 |
| 3,408,278 | 10/1968 | Stoodley | 204/181 |

OTHER PUBLICATIONS

Immendorfer, I.B.M. Technical Disclosure Bulletin "Applying Photoconductive Elements on Nonconductive Substrates," Vol. 6, No. 6, November 1963, p. 77.
Wein, Metal Finishing, " Metallizing Non-Conductors," September, 1944, pp. 534–538.

*Primary Examiner*—Howard S. Williams
*Attorney*—Chisholm and Spencer

[57] ABSTRACT

Application of resinous organic coatings onto non-conductive surfaces by electrodeposition is accomplished by first applying on the surface a layer of conductive particles in a carrier and then employing the surface as an electrode in an electrodeposition coating process to deposit a resinous coating on the surface. Carbon or metal particles can be used in the conductive layer and any electrodepositable resinous film-forming coating composition can be utilized in the process.

23 Claims, No Drawings

COATING METHOD

This invention relates to a method of electrodepositing a coating over a base coat and, more particularly, to such a method in which the base coat is electrically conductive.

Electrodeposition is a relatively new coating process which, although based on certain well known principles, has become economically feasible only as a result of the recent development of compositions which have the desired characteristics and which can be effectively electrodeposited. The coatings provided have excellent properties for many applications, and electrodeposition results in a uniform coating which does not run or wash off during baking.

While electrodeposition is in many respects advantageous compared to ordinary application methods, there are several inherent limitations on the use of the process. One of these, for example, is that the surface to be coated must be electrically conductive, which ordinarily means that the article to be coated must be made of metal or other conductive material. Another disadvantage is a result of the increase in resistance due to the film build, which although directing deposition to more thinly coated areas and thereby providing uniform coatings, also limits the thickness of the coating that can be achieved because the resistance of the coating reaches a point at which the conductivity is too low to continue the deposition. The maximum film build possible varies, but in most cases approximates the film thickness desired for a single layer of a protective coating composition. Attempts to achieve thicker coatings or multiple coatings, as by increasing the voltage, generally result in rupture of the film.

For such reason, electrodeposition as a coating method has been essentially limited to primers to which another coating is applied by other means, or to one-coat systems.

The present invention provides a method whereby surfaces of non-conductive material, including painted or otherwise previously coated surfaces, can be coated by electrodeposition, thereby utilizing the advantages of electrodeposited coatings. The invention also provides a method whereby a surface, either conductive or non-conductive, can be coated with one or more base coats and then coated with an electrodeposited coating.

The method of the invention comprises the steps of first applying to the surface to be coated a layer of an electrically conductive coating composition, and then employing the coated surface as an electrode in an electrodeposition process.

The electrically conductive coating composition employed in the first step of the present process consists of a carrier containing dispersed conductive particles along with, if desired, other pigments, additives and the like. The conductive particles that are employed include carbon and various metals such as zinc, nickel, stainless steel, aluminum, chromium, manganese, copper and cadmium, of which zinc is the metal most often used. Various forms of carbon can be utilized, including the several types of carbon black and graphite. Because of the increased conductivity thus achieved, it is preferred to employ graphite particles, at least in part, whenever carbon-containing compositions are used.

The carrier for the conductive particles can be a liquid medium such as water or an organic solvent, but it is preferred to utilize a resinous binder as the carrier. A number of resinous film-forming materials can be employed as the binder for the conductive particles. These include, for example, vinyl halide resins, such as polyvinyl chloride and vinyl chloride-vinyl acetate copolymers; acetalized polyvinyl alcohol resins, such as polyvinyl butyral or other full or partial acetals of polyvinyl alcohol; alkyd resins, such as linseed oil-modified glyceryl phthalate resins; aminoplast resins, such as melamine-formaldehyde and urea-formaldehyde condensation products; hydrocarbon resins, such as polyethylene and polystyrene; phenolic resins, including the various phenol-formaldehyde and substituted phenol-formaldehyde condensates; acrylic resins, such as polymethyl methacrylate and copolymers of various alkyl acrylates and methacrylates; unsaturated carboxylic acid amide interpolymers, such as interpolymers of acrylamide, styrene and ethyl acrylate, in which all or part of the amide groups are substituted with butoxymethyl radicals; oleoresinous vehicles, such as tung oil or other drying oil-phenolic resin varnishes; modified and unmodified drying oils, such as linseed oil or linseed oil modified by reaction with maleic anhydride or cyclopentadiene, cellulose esters and ethers, such as nitrocellulose and ethyl cellulose; and any other film-forming resinous material which acts as a binder for the conductive carbon or metal particles. Certain conductive compositions of utility herein are disclosed in U.S. Pat. No. 3,110,691, and in copending application Ser. No. 145,479, filed Oct. 16, 1961, now abandoned, and Ser. No. 94,682, filed Mar. 10, 1961, now U.S. Pat. No. 3,175,991, granted Mar. 30, 1965.

The proportion of conductive particles in the composition can be varied widely for purposes of the invention, it only being necessary that sufficient particles are present to provide an electrically conductive surface. The type of carrier in part determines the amount of particles that need be present, but in ordinary cases from about 30 percent to about 95 percent by weight of the composition should be made up of the conductive particles.

A number of electrodepositable compositions are known and can be employed to provide the electrodeposited coating applied over the conductive base coat. Virtually any water-soluble, water-dispersible, or water-emulsifiable resinous material can be electrodeposited and, if film-forming, provides a coating which may be suitable for certain purposes. Thus, any such electrodepositable material is included among those that can be employed in the present invention, even though the coatings obtained may not be entirely satisfactory, except for certain specialized uses.

Several coating compositions are known, however, which can be electrodeposited with especially good results to provide coatings of highly desirable properties for many widely used applications. A preferred class of coating compositions are those in which the vehicle is an at least partially-neutralized reaction product of a drying oil fatty acid ester with an alpha, beta-ethylenically unsaturated dicarboxylic acid or an anhydride of such an acid. The composition may also comprise the reaction product of the ester, acid or anhydride and one or more other ethylenically unsaturated monomers. The initial reaction products as above may also be partially reacted with an alcohol to esterify part of the carboxylic groups from the acid or anhydride prior to neutralization of all or part of the remaining acidic radicals with a base.

The fatty acid esters used to make the aforesaid vehicles are esters of fatty acids which are or can be derived from drying oils or from such sources as tall oil. (By "drying oil" is meant those oils having an iodine number of greater than 90, thus including so-called "semi-drying oils.") Examples of such esters include linseed oil, safflower oil, perilla oil, tung oil, oiticica oil, sunflower oil, tall oil esters, dehydrated castor oil, fish oils, and the like.

The fatty acid ester may also be an alkyd resin prepared utilizing semi-drying or drying oil; an ester of an epoxide with such fatty acids; a semi-drying or drying oil fatty acid ester of a polyol; or semi-drying or drying oil fatty acid ester of a resinous polyol. If desired, the ester may be modified with other acids, such as saturated, unsaturated or aromatic acids, as well as with such acid materials as rosin.

The alpha, beta-ethylenically unsaturated dicarboxylic acid or anhydride may be an anhydride such as maleic anhydride or itaconic anhydride, or an unsaturated dicarboxylic acid which forms an anhydride, for example, maleic acid or itaconic acid. The acids appear to function by first forming an anhydride. Fumaric acid, which does not form an anhydride, may also be employed, as well as mixtures of any of the above acids or anhydrides. Usually the anhydride or acid employed contains from four to 12 carbon atoms. The reaction between the acid or anhydride and the fatty acid ester takes place readily without the use of a catalyst at temperatures between about 100° C. and about 300° C., depending primarily upon the type of fatty acid ester used.

As indicated, the reaction product can also include one or more other ethylenically unsaturated monomers in polymerized form. Essentially, any ethylenically unsaturated monomer, e.g., those containing

groups, can be employed for this purpose, with the preferred compounds being styrene, substituted styrenes, alkyl acrylates, alkyl methacrylates, diolefins and acrylonitrile. When such an additional monomer is employed, the reaction is best carried out by first reacting the acid or anhydride with the fatty acid ester and then reacting this product with the monomer at somewhat lower temperatures.

Although the proportions of the components in the foregoing reaction products are not critical, it is preferred to utilize between about 10 percent and about 45 percent by weight of the unsaturated acid or acid anhydride with about 55 percent to about 90 percent by weight of fatty acid ester. If an ethylenically unsaturated monomer is incorporated in the reaction product, it is typically used in amounts between about 5 percent and about 35 percent by weight based upon the total weight of acid or anhydride and ester.

Neutralization of these products is accomplished by reaction of all or part of the dicarboxylic anhydride groups with a base. Usually up to about half of such groups are neutralized in unesterified adducts; the partially esterified products are often neutralized to a greater extent, based on unesterified acid groups remaining. Inorganic bases, such as metal hydroxides or, more desirably, ammonia, can be used for this purpose, as can organic bases, particularly amines. Among the preferred class of neutralizing bases are ammonia and any basic amine, including alkyl amines, cycloalkyl amines, unsaturated amines, aromatic amines, aryl amines, aralkyl amines, cyclic amines, diamines and substituted amines, of the primary, secondary, tertiary or quaternary amine types.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom, with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

The electrodepositable coating compositions comprising the above reaction products described contain in most instances a pigment composition and, if desired, various additives such as anti-oxidants, surface active agents and the like. The pigment composition may be of any conventional type, comprising, for example, iron oxides, lead oxides, strontium chromate, carbon black, titanium dioxide, talc, barium sulfate, as well as color pigments such as cadmium yellow, cadmium red, chromic yellow and the like. Better results with pigmented compositions are attained if the weight ratio of pigment solids to vehicle solids is not higher than about 1.5 to 1, and preferably not higher than about 1 to 1. The coating compositions when employed for electrodeposition usually are made up of at least about 80 percent water.

Compositions within this general class are described in copending applications, Ser. No. 222,674, filed Sept. 10, 1962, now U.S. Pat. No. 3,366,563, granted Jan. 30, 1968, and Ser. No. 282,880, filed May 24, 1963, now U.S. Pat. No. 3,369,983, granted Feb. 20, 1968.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product or a polyepoxide, or both, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid or other acids of up to about six carbon atoms can also be employed. The hydroxyalkyl ester is usually hydroxyethyl or hydroxypropyl acrylate or methacrylate, but also desirable are the various hydroxyalkyl esters of the above acids having, for example, up to about five carbon atoms in the hydroxyalkyl radical. Mono- or diesters of the dicarboxylic acids mentioned are included. Ordinarily, the acid and ester each comprise between about 1 per cent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene; but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition. The bases above can be used, with ammonia and amines being preferred; except when a polyepoxide is present, in which case there is preferably employed a hydroxide, such as sodium hydroxide, or if an amine, a tertiary amine.

The amine-aldehyde condensation products included in these compositions are, for example, condensation products of melamine, benzoguanamine, or urea with formaldehyde, although other amino-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

The electrodepositable compositions can also include a polyepoxide, which can be any epoxide compound or mixture with an epoxy functionality of greater than 1.0. Numerous such polyepoxides are known and are described in patents such as U.S. Pat. Nos. 2,467,171; 2,615,007; 2,716,123; 2,786,067; 3,030,336; 3,053,855; and 3,075,999. Included are polygylcidyl ethers of polyphenols, such as bisphenol A, or of aliphatic polyhydric alcohols, such as 1,4-butanediol; polyglycidyl esters of polycarboxylic acids, such as diglycidyl adipate; and polyepoxides from the epoxidation of unsaturated alicyclic compounds, such as 3,4-epoxy-6-methyl-cyclohexylmethyl-3,4-epoxy-6-methylcyclohexanecarboxylate.

Electrodepositable compositions comprising the above interpolymers and an amine-aldehyde resin or a polyepoxide, or both, are more fully described in copending application Ser. No. 368,394, filed May 18, 1964, now U.S. Pat. No. 3,408,088, granted Sept. 24, 1968.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis (methoxymethyl) melamine.

The alkyd-amine compositions are dispersed in water and they ordinarily contain from about 10 percent to about 50 percent by weight of amine resin based on the total resinous components.

Examples of compositions of this class are described in U.S. Pat. Nos. 2,852,475; 2,852,476; and 2,853,459.

In electrodeposition processes employing the various coating compositions described above, an aqueous bath containing the coating composition is placed in contact with an electrically conductive anode and an electrically conductive cathode. The surface to be coated is employed as one of the electrodes. In the specific examples of compositions described above, the surface to be coated is employed as the anode. Upon the passage of electric current between the anode and the cathode, while in contact with the bath containing the coating composition, an adherent film of the coating composition is deposited. The conditions under which the electrodeposition step herein is carried out are those conventionally used in electrodeposition of coatings. The applied voltage may be varied greatly and can be, for example, as low as 1 volt or as high as several thousand volts, although typically between 50 volts and 500 volts. The current density is usually between about 0.1 ampere and 15 amperes per square foot, and tends to decrease during the electrodeposition.

The concentration of the non-volatile components (i.e., vehicle and any pigments and the like) in the aqueous bath is not critical and relatively high levels can be employed. However, it is ordinarily desirable to use as low a concentration as gives satisfactory results, and in the cases of the above described compositions, aqueous compositions containing as little as 1 percent by weight of non-volatile solids can be employed, with those containing between 5 percent and 20 percent by weight being preferred.

The method of the invention is applicable to the coating of any substrate, whether conductive or non-conductive. When it is desired to coat a metal substrate such as steel, aluminum, copper or the like, it is often desirable to provide a primer coating (which may or may not be electrodeposited), and then to recoat with another coating of the same or different composition. Heretofore, it has not been possible to apply the additional coating by an electrodeposition method. By means of the present invention, on such a substrate there is first applied the conductive coating, either on the metal or on a previously applied primer, and then a super-imposed electrodeposited coating.

In other instances, it is desirable to coat non-conductive surfaces such as wood, plastics, paper or the like. The present invention provides a means whereby such surfaces can also be coated by electrodeposition in the manner described above. If several electrodeposited coatings are required, the process is repeated by applying an intermediate coat of the electrically conductive composition.

The invention will be further described in conjunction with the following examples, which are to be considered illustrative rather than limiting. All parts and percentages in the examples and throughout this specification are by weight unless otherwise stated.

EXAMPLE 1

A coating composition was produced as follows:

A first vehicle resin (Resin A) was produced by heating a 4 to 1 weight mixture of linseed oil and maleic anhydride to 250° C. over a 2-hour period, and then holding this mixture at this temperature for 15 minutes. The product was mixed with deionized water and diethylamine to give a solution with a pH of about 7.2 and a solids content of 35 percent.

A second vehicle resin (Resin B) was produced by reacting a 4 to 1 weight ratio of linseed oil and maleic anhydride as before, and then reacting 300 parts of the product with 75 parts of styrene in the presence of ditertiary butyl peroxide at 150° to 200° C. The product obtained was partially esterified by mixing 250 parts thereof with 13.5 parts of methanol and heating to 90° C. for a total of 3 hours. The product was mixed with deionized water and diethylamine to give a solution with a pH of about 7 and a solids content of 40.8 percent.

A pigment paste was made by grinding the following in a steel ball mill for 16 hours; at the beginning of the grinding period sufficient diethylamine was added to make the pH about 9.

| | Parts by Weight |
|---|---|
| Resin A above (35% solids) | 42 |
| Strontium Chromate | 7.5 |
| Carbon Black (30% aqueous dispersion) | 25 |
| Red iron oxide | 135 |
| Dispersing agent (combination oil-soluble sulfonate and non-ionic surfactant—Witco 912) | 1.5 |
| Deionized water | 44 |

The coating composition was produced by mixing the above pigment paste (255 parts) with 391 parts of Resin A (35 percent solids) and 373 parts of Resin B (40.8 percent solids), along with sufficient deionized water to make the total solids content of the composition 8 percent.

A zinc phosphate treated steel panel (Bonderite 37) was coated with a non-conducting base coat by immersing the panel in the above coating composition at 75° F. and applying a potential of 100 volts between the said panel as the anode and a similar steel cathode. After 90 seconds deposition time, a uniform coating on the panel was obtained, which after baking for 20 minutes at 350° F. was 1.0 mil thick.

The coated panel was then sprayed with a conductive primer of the following composition:

| | Parts by Weight |
|---|---|
| Vinyl butyral resin (Vinylite XYHL; 54.4 % vinyl, 38.3% butyraldehyde; 0.3% acetate; 7.0% hydroxyl) | 47.0 |
| Carbon black (Aromex CF; oil absorption 110) | 35.0 |
| Graphite (No. 7) | 35.0 |
| Toluene | 308 |
| Methanol | 255 |
| Butanol | 62 |

The layer of conductive primer was dried for 3 minutes at 180° F., and was 0.4 mil thick.

The panel was then coated once more by electrodeposition with the same conditions as before, using a coating composition containing 255 parts of the pigment paste above, 826 parts of Resin A (35 percent solids) and sufficient water to make the total solids content 8 percent. After baking for 20 minutes at 350° F., a coating having good properties was obtained. The panel thus had a three-layer coating which provided excellent protection against corrosion and which had other similarly desirable characteristics.

EXAMPLE 2

Example 1 was repeated, omitting the base coat and employing a conductive primer of the following composition:

| | Parts by Weight |
|---|---|
| Reaction product of ethylene diamine and polymeric fatty acids, chiefly dilinoleic acid, with an amine number of 210–220 (Versamid 115) | 45 |
| Anhydrous colloidal silica (Cab-O-Sil) | 22 |
| Red iron oxide | 6 |
| Urea-formaldehyde resin (made from 1 mole of urea, | |

| | |
|---|---|
| 3.1 moles of formaldehyde and 1.76 moles of butanol) | 8 |
| Epoxy resin (reaction product of bisphenol A and epichlorohydrin with epoxide equivalent of 450–525; 75% solids in xylene) | 133 |
| Zinc dust | 2100 |
| Xylene | 99 |
| Aromatic naphtha (Solvesso 150) | 6 |
| Methyl isobutyl ketone | 86 |
| Ethyl cellusolve | 113 |

The conductive primer was dried at 180° F. for 20 minutes, and was varied in film thickness from 0 to 4 mils. The electrodeposited coating obtained had good adhesion and other properties.

Various other electrodepositable compositions and conductive compositions can be substituted for those of the examples. In the above and other tests, the general applicability of the method herein has been shown and it has been found that good results are attained using varying compositions, electrodeposition conditions, and substrates.

According to the provisions of the patent statutes, there are described above the invention and what are now considered to be its best embodiments. However, within the scope of the appended claims, it is to be understood that the invention can be practiced otherwise than as specifically described.

We claim:

1. A method of applying an electrodeposited coating which comprises the steps of
   1. applying to the surface to be coated a layer of electrically conductive coating composition comprising conductive particles in a carrier, and
   2. employing the coated surface as an electrode in an electrodeposition process in which an electric current is passed between said electrode and another electrically conductive electrode, both electrodes being in contact with an aqueous bath containing an electrodepositable resinous, film-forming coating composition.

2. The method of claim 1 in which said conductive particles are selected from the group consisting of carbon particles and metal particles.

3. The method of claim 1 in which said conductive particles are dispersed in a resinous binder.

4. The method of claim 1 in which said electrodepositable composition comprises an at least partially neutralized reaction product of a drying oil fatty acid ester and an alpha, beta-ethlenically unsaturated dicarboxylic acid anhydride.

5. The method of claim 1 in which said electrodepositable composition comprises an alkyd resin and an amine-aldehyde resin.

6. The method of claim 1 in which said electrodepositable coating comprises an at least partially neutralized interpolymer of an unsaturated carboxylic acid and a hydroxyalkyl ester of an unsaturated carboxylic acid, and at least one member of the group consisting of amine-aldehyde resins and polyepoxides.

7. The method of claim 1 in which a plural coating is obtained by carrying out each of steps (1) and (2) more than once.

8. A method of applying an electrodeposited coating on a non-conducting surface which comprises the steps of
   1. applying to said non-conducting surface a layer of electrically conductive coating composition comprising a resinous binder containing dispersed conductive particles selected from the group consisting of carbon particles and metal particles, and
   2. employing the coated surface as an electrode in an electrodeposition process in which an electric current is passed between said electrode and another electrically conductive electrode, both electrodes being in contact with an aqueous bath containing an electrodepositable resinous, film-forming coating composition.

9. The method of claim 8 in which said nonconducting surface is a layer of a non-conductive coating composition.

10. The method of claim 9 in which said layer of a non-conductive coating composition is superimposed on a metal surface.

11. The method of claim 9 in which said layer of a non-conductive coating composition is an electrodeposited coating.

12. An electrophoretic painting process which process comprises applying to an article to be coated, a conductive undercoat of a paint which paint incorporates a conductive pigment whereby the undercoat is conductive after curing, curing the undercoat and thereafter applying to the so-coated article a further coating of a paint by means of electrophoretic deposition.

13. An electrophoretic painting process as claimed in claim 12, wherein the dispersion of paint which provides the undercoat is a water-thinnable paint comprised of said conductive pigment and a water-dispersable resin which on deposition on to the article acts as a binder for the pigment.

14. An electrophoretic painting process as claimed in claim 13 wherein the conductive pigment is carbon.

15. An electrophoretic painting process as claimed in claim 14 wherein the conductive pigment is carbon.

16. A coated article comprising an article having a conductive layer coated with a cured paint dispersion coating containing distributed therethrough a conductive pigment and said cured paint dispersion coating is coated with a cured, electrophoretically deposited paint dispersion.

17. An article according to claim 16 wherein the conductive pigment is carbon.

18. An electrophoretic painting process which process comprises applying by electrophoretic means to an article to be coated, which possesses a conductive outer layer, a conductive undercoat which is deposited from an aqueous bath comprising a dispersion of a paint which paint incorporates a conductive pigment whereby the undercoat is conductive after curing, curing the undercoat and thereafter applying to the so-coated article a further coating of a paint by means of electrophoretic deposition.

19. An electrophoretic painting process as claimed in claim 18, wherein the dispersion of paint which provides the undercoat is a water-thinnable paint comprised of said conductive pigment and a water-dispersable resin which on deposition on to the article acts as a binder for the pigment.

20. An electrophoretic painting process as claimed in claim 19 wherein the conductive pigment is carbon.

21. An electrophoretic painting process as claimed in claim 20 wherein the carbon is lamp-black.

22. A coated article comprising an article having an outer conductive layer coated with a cured electrophoretically deposited paint dispersion containing distributed therethrough a conductive pigment and said cured paint dispersion coating is coated with a cured, electrophoretically deposited paint dispersion.

23. An article according to claim 22 wherein the conductive pigment is lamp-black.

* * * * *

UNITED STATES PATENT OFFICE
CERTIFICATE OF CORRECTION

Patent No. 3,674,670                      Dated July 4, 1972

Inventor(s) J. Alden Erikson et al.

It is certified that error appears in the above-identified patent and that said Letters Patent are hereby corrected as shown below:

Claim 15, line 2, "carbon" should be ---lamp-black---

Claim 23, line 2, "lamp-black" should be ---carbon---

Signed and sealed this 23rd day of January 1973.

(SEAL)
Attest:

EDWARD M. FLETCHER, JR.                ROBERT GOTTSCHALK
Attesting Officer                      Commissioner of Patents